(12) United States Patent
Robinson, III et al.

(10) Patent No.: US 10,048,902 B2
(45) Date of Patent: Aug. 14, 2018

(54) METHODS AND SYSTEMS FOR ON-DEMAND PUBLISHING OF RELIGIOUS WORKS

(71) Applicant: NARROW GATE PUBLISHING, LLC, Scappoose, OR (US)

(72) Inventors: William Robinson, III, Vancouver, WA (US); Kristin Robinson, Vancouver, WA (US)

(73) Assignee: REVIVAL AI LLC, Falcon, CO (US)

( * ) Notice: Subject to any disclaimer, the term of this patent is extended or adjusted under 35 U.S.C. 154(b) by 0 days.

(21) Appl. No.: 15/129,637

(22) PCT Filed: Mar. 25, 2015

(86) PCT No.: PCT/US2015/022559
§ 371 (c)(1),
(2) Date: Sep. 27, 2016

(87) PCT Pub. No.: WO2015/148718
PCT Pub. Date: Oct. 1, 2015

(65) Prior Publication Data
US 2017/0177280 A1   Jun. 22, 2017

Related U.S. Application Data

(60) Provisional application No. 61/971,307, filed on Mar. 27, 2014.

(51) Int. Cl.
*G06F 3/12*   (2006.01)
(52) U.S. Cl.
CPC .......... *G06F 3/1206* (2013.01); *G06F 3/1205* (2013.01); *G06F 3/1208* (2013.01);
(Continued)

(58) Field of Classification Search
CPC ...................................................... G06F 3/1206
(Continued)

(56) References Cited

U.S. PATENT DOCUMENTS

| 2007/0042332 A1 | 2/2007 | Leem | |
| 2007/0132166 A1* | 6/2007 | Andres | B42D 1/001 270/12 |

(Continued)

FOREIGN PATENT DOCUMENTS

| JP | 2011085711 | 4/2011 |
| JP | 2012068484 | 4/2012 |

OTHER PUBLICATIONS

PCT Search Report and Written Opinion dated Jun. 22, 2015 for PCT Application No. PCT/US15/022559, 10 Pages.
(Continued)

*Primary Examiner* — Jacky Zheng
(74) *Attorney, Agent, or Firm* — Lane Powell PC

(57) ABSTRACT

Systems and methods for on-demand publication of religious works include receiving user selections for exterior customization options, interior customization options, and a prompt to add user-added or user-created content. The disclosed systems and methods compiled customized religious works and optionally print some portion of a hard copy of the religious work on a thin paper that is 28-50 grams per square meter or less. In some examples, the printing process includes light-fusion printing processes, and/or an electronic copy format of the customized religious works created. The example printing process can print single volume or low volumes of hard copies of customized religious works using the light-fusion printing processes.

20 Claims, 6 Drawing Sheets

(52) U.S. Cl.
CPC .......... *G06F 3/1237* (2013.01); *G06F 3/1241* (2013.01); *G06F 3/1242* (2013.01); *G06F 3/1253* (2013.01); *G06F 3/1275* (2013.01)

(58) Field of Classification Search
USPC ........................................................ 358/1.15
See application file for complete search history.

(56) References Cited

U.S. PATENT DOCUMENTS

| | | |
|---|---|---|
| 2007/0256011 A1 | 11/2007 | Jones |
| 2009/0112652 A1* | 4/2009 | Kelsey ............. G06Q 10/06311 705/7.13 |
| 2009/0230668 A1* | 9/2009 | Andres .................. B42D 1/009 281/16 |
| 2009/0254802 A1 | 10/2009 | Campagna et al. |
| 2013/0219267 A1 | 8/2013 | Gremion et al. |

OTHER PUBLICATIONS

Supplementary European Search Report dated Oct. 19, 2017, EP Application No. 15767743.6, Filed Mar. 25, 2015.

\* cited by examiner

| 400 | Interior customization | |
|---|---|---|
| 402 — TRANSLATION ▼ | MAP(S) ▼ | 426 |
| 404 — TEXT LAYOUT ▼ | CONFESSION(S) ▼ | 428 |
| 406 — FONT STYLE & SIZE ▼ | CREED(S) ▼ | 430 |
| 408 — MARGIN SIZE ▼ | COMMENTARY ▼ | 432 |
| 410 — TEXT COLOR(S) ▼ | CRITIQUES ▼ | 434 |
| 412 — HEADINGS ▼ | INTERPRETATIONS ▼ | 436 |
| 414 — INTRODUCTION(S) ▼ | INDICE(S) ▼ | 438 |
| 416 — CROSS-REFERENCE ▼ | APPENDICE(S) ▼ | 440 |
| 418 — FOOTNOTE(S) ▼ | DICTIONARIES ▼ | 442 |
| 420 — NOTE LAYOUT ▼ | ARTICLE(S) ▼ | 444 |
| 422 — NOTE OPTION(S) ▼ | OTHER MATERIAL(S) ▼ | 446 |
| 424 — CONCORDANCE ▼ | | |

448 — ADD EXTRA BLANK PAGES: YES ▼

450 — ADD CUSTOM TEXT AND/OR IMAGE: YES ▼

452 — [+ Add custom text/image]

454 — Cancel   Save — 456

FIGURE 4

METHODS AND SYSTEMS FOR ON-DEMAND PUBLISHING OF RELIGIOUS WORKS

CROSS-REFERENCE TO RELATED APPLICATIONS

This application is a 35 USC § 371 filing of International Application No. PCT/2015/022559, filed Mar. 25, 2015 and entitled METHODS AND SYSTEMS FOR ON-DEMAND PUBLISHING OF RELIGIOUS WORKS, which claims the benefit of U.S. Provisional Patent Application Ser. No. 61/971,307, filed Mar. 27, 2014, entitled METHODS AND SYSTEMS FOR ON-DEMAND PUBLISHING OF RELIGIOUS WORKS, which is herein incorporated by reference in its entirety.

FIELD OF THE INVENTION

This invention relates to on-demand publishing of religious works and, more specifically, to on-demand publishing of customized religious works.

BACKGROUND

Most religions of the world have religious texts or scriptures in which core values, tenets, and traditions are written. The religious texts or scriptures are extensively studied by many people, including members and clergy of the subject religion, members and clergy of other religions, scholars, historians, and many other interested people. Religious texts hold a sacred place in peoples' practice of their chosen religion.

For example, the scripture foundation of Christianity is the Bible, which contains the principles, values, and beliefs of Christians around the world. Countless people have closely studied the Bible throughout history and continue to do so in modern society. Every year, approximately 50-100 million Bibles are sold in the United States alone.

Because religion holds a personal, intimate place in peoples' lives, some students of religion would like to have customized religious works. Conventional customized religious texts are generally limited to adding a person's name or initials to a book cover or selecting a custom book cover. Other customizable religious texts might allow purchasers to add their names to the text of the scripture, such as by inserting users' names when reciting psalms or prayers. However, none of the known customizable religious texts or scriptures provide a user with the ability to create an on-demand religious text publication with a robust selection of exterior and/or interior customization options with an option of adding selected user content to the existing religious scripture.

Further, most religious texts are printed on thin paper, such as Bible scriptures that are traditionally printed on paper having a standard weight of about 28-40 grams per square meter. Printing on such thin paper presents many challenges, such as the bulkiness of the resulting printed text and the risk of damaging the paper during the step of heating the paper in conventional heat-fusion printing processes.

Conventional digital printing techniques deposit powders, such as thermoplastic powders, onto a substrate like paper. The powder is then melted using a heat-fusion technique according to the input digital images, which results in a raised image affixed to the paper. The raised ink causes the thickness of the printed paper to increase and thus the overall bulkiness of the printed text to increase. The resulting printed texts are bulky and can be undesirable.

Further, the heating process that is required to melt the powdered ink and other toner to the paper can damage thinner paper, such as paper having a weight below 50 grams per square meter. The heat-damaged paper results in a low quality end product. Because of the known problems with printing on thin paper, publishers are often unwilling to print single copies or low volume orders of any publication request that is to be printed on thin paper, including customized religious works.

Therefore, methods and systems that allow users to create on-demand publishing of customized religious texts is a desirable advancement in the art.

SUMMARY OF THE DISCLOSURE

Methods of on-demand printing of customized religious works are disclosed. The methods can include receiving data with a first user selection for at least one exterior customization option for a religious work. The method also includes receiving data with a second user selection for at least one interior customization option for the religious work. The method also includes presenting a user content prompt that includes offering to accept at least one of user-added and/or user-created content to the religious work and also includes receiving data with a third user selection that includes a response to the user content prompt. The method also includes compiling the exterior customization option, the interior customization option, and the response to the user content prompt into a customized religious work.

Further, other methods of on-demand publishing of a customized religious work are also disclosed. The methods can include receiving a request for publication of a religious work that includes one or more exterior customization options, one or more interior customization options, and one or more user-added and/or user-created content customization options. The method also includes receiving a request to publish the religious work in one or both of a hard copy format and an electronic copy format.

BRIEF DESCRIPTION OF THE DRAWINGS

FIG. 4 is an example user interface screen for selecting interior customization options for the religious work.

DETAILED DESCRIPTION

The disclosed methods and systems of on-demand publishing of religious works offers users the ability to create new, unique, customized religious texts and scriptures that suit their individual needs. The user or student of the customized religious text is any person, group of people, and/or entity that wishes to create a customized religious text and includes clergy, students, individual people interested in the religious, churches, religious groups of any kind, and any other person or entity that wants to create a customized religious work. The religious works include Christian, Jewish, Muslim, Buddhist, a combination thereof or any other worldly religion's texts. The customized religious works created by any user or group of users can be used for personal or group use and/or can be sold by any user, group, manufacturer, or publisher.

The ability to customize users' religious works can reduce the number of works that each user owns and increase the usefulness of the customized work for the user, among other benefits. For example, users that have customized Bibles with the desired notes sections, study aids, and translations tend to use the Bible more often, which increases their understanding of the religious work, and improves their overall satisfaction and happiness in using the religious work.

The on-demand nature of the disclosed methods and systems allow a user to create a single copy or a low volume set of copies of the customized religious works. As discussed further below, users are able to create customized religious works and are able to order them in desired single or low quantities with the disclosed methods and systems. The on-demand nature of the disclosed methods and systems means that the users do not have to order large quantities and/or wait long periods of time to receive their customized religious work. Because of the conventional, heat-fusion printing methods used to print customized works, customized religious texts, typically printed on thin paper, were expensive to publish, took a long time to print, and did not offer a large variety of customization options.

The conventional heat-fusion printing methods typically had to create a custom press for the desired custom print job, which was expensive and time-consuming to manufacture. As a result, few users chose to create customized religious works and those who did choose customized religious works were forced to pay high prices and had lengthy times to wait for their finished works. The disclosed methods and systems offer a wide variety of customization options to the users, allow users to print single or low volumes copies of the customized religious works, and can print the hard copies of the religious works on thin paper having a weight of 28 grams per square meter or less.

Figure 1:
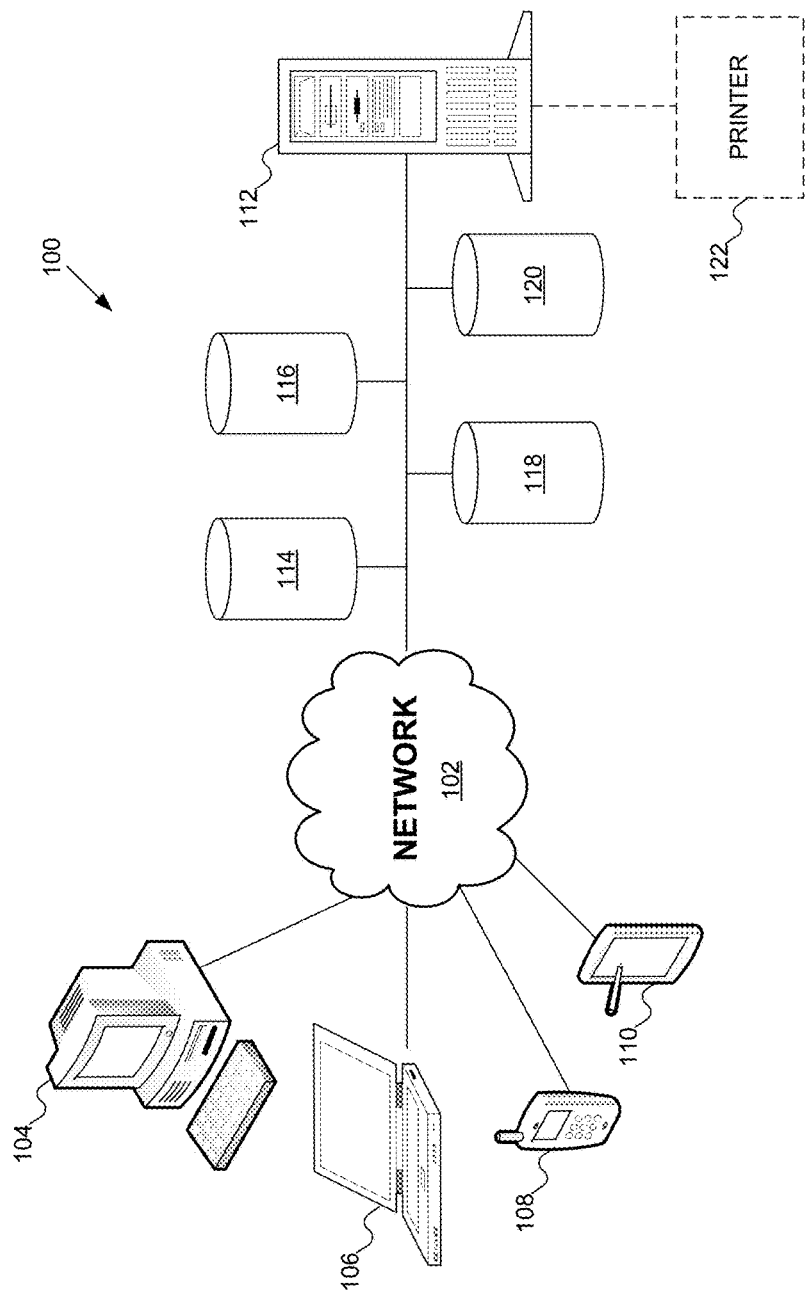
FIG. 1 is an example system of the disclosure.

FIG. 1 shows an example system 100 in which multiple types of computing devices 104, 106, 108, 110 connect to multiple databases 114, 116, 118, 120 and a server 112 over a network 102. The methods and systems of on-demand publishing of customized religious works discussed herein can be embodied in software or other computer-executable instructions that run on a computing device, such as a personal computing device like a desktop computer 104 or laptop 106 or on a handheld device like a smartphone 108 or tablet 110. The software can be in the form of an application or "app" suited for a particular user device. The software serves as a user interface for a user to input and retrieve data to be stored or accessed, respectively, on a remote server 112. The individual computing devices 104, 106, 108, 110 connect to the remote server 112 over a network 102 of any suitable kind, including wired or wireless WiFi connections, local area networks (LANs), and wide area networks (WANs). In alternative examples, a user can directly connect to the server of the disclosed systems and methods.

In some examples, access to the system databases 114, 116, 118, 120 and the server 112 is restricted and may be password protected or the system may require a user to make a payment before permitting access to the databases 114, 116, 118, 120 and the server 112. Once the user is permitted to access the databases 114, 116, 118, 120 and the remote server 112, then the user is permitted to begin creating a customized religious work and optionally, printing or ordering copies of the customized religious works. The databases 114, 116, 118, 120, which are discussed in detail below, include a library of materials for various customization options for the religious works. For example, one of the databases 114 includes options for customizing the exterior of the religious work while another one of the databases 116 includes options for customizing the interior of the religious work. Still another one of the databases 116 includes options of materials that other users have added to the available library of customization options and yet another one of the databases 120 includes options for the users to upload or create their own customization options.

The remote server 112 has memory (not shown) that can store the customization options of the religious works created by various users and users can access the stored customization options any desired number of times. The remote server 112 can also allow users to edit, delete, or share their stored, customized religious works with other users or to send copies, such as an electronic copy over e-mail, to another user or person for feedback or any other purpose.

For example, an individual student at a seminary chooses to create a custom Bible for his or her individual study. The student chooses one or more exterior customization options and an interior customization option such as the Biblical translation, but has not yet selected the desired notes and the maps. The student is able to store the selected customization options for later use and further creation.

Still further, the remote server 112 can, in some examples, be connected to a printer or printing services and can give users the option to print hard copies or compile electronic copies of the customized religious work. The hard copies can be printed in any desired quantity and may be printed in single copies, if desired. The users are able to customize the hard copy printing of the customized religious work as well, such as by selecting the type of paper and style of printing. For example, many users prefer religious works to be printed on thin paper having a weight of 28-50 grams per square meter. As explained further below, the thin paper facilitates large quantities of paper being compiled into a single written text without excessive bulk. Generally to print on thin paper, a non-heat based printing process, such as a light-fusion printing process, is used to avoid any heat damage to the paper during the printing process. Some light fusion printing processes use a light-activated ink or resin that is applied to a substrate like thin paper. The ink/resin and paper are then exposed to a light, such as ultraviolet (UV) or other triggering light sources, that fuses or otherwise causes the ink or resin to adhere to the substrate or paper.

The users can also create an electronic copy of their customized religious works, either separate or in combination with the hard copy. For those users choosing to create both a hard copy and an electronic copy, the users can choose to create an identical version of the customized religious work in both the hard and electronic copy formats. Alternatively, the users can create different versions in each of the hard and electronic copy formats and may choose to customize the hard copy format for hard copy use and the electronic copy format for electronic copy use. For example, the user chooses to create a hard copy work with blank pages for written notes, but the user does not need the same blank notes pages in the electronic copy. Additionally, the user may want the electronic copy to be searchable by keyword or phrase while such electronic searching is irrelevant to hard copies.

The electronic copies can be stored and are viewable and sendable across multiple electronic devices. For example, the electronic copies can be stored on a remote server, such as server 112 in FIG. 1 and/or can be saved to a user's computing device, such as any of the computing devices 104, 106, 108, 110 in FIG. 1. The user can optionally choose to share the customized religious work or portions of it with other users of the disclosed methods and systems. The user can create electronic and/or hard copies of the customized religious work with any desired customization options.

The disclosed systems and methods for creating on-demand, customized religious works give the users the option to select one or more exterior customization options, one or more interior customization options, and add other user-added and/or user-created content to the customized religious work. Further, publishers and/or manufacturers of the custom, religious works provide the exterior customization, interior customization, and added content options to the users and print and/or create an electronic copy of the requested religious work. The disclosed methods and systems can be presented on a website on the Internet and/or can be offered in other formats as well, such as applications on computing devices like a smart device or tablet, or in hard copy or in person formats like catalogs, telephone and television offers, and the like.

Figure 2:
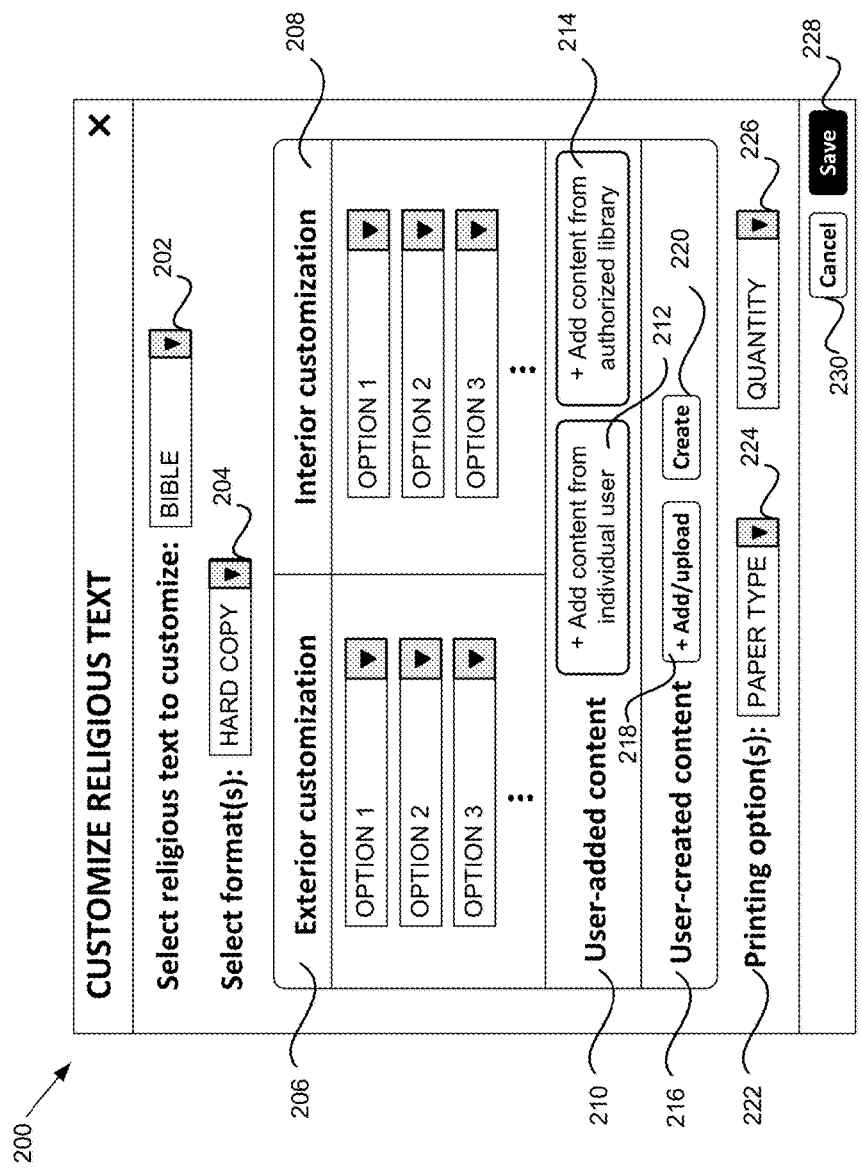
FIG. 2 is an example user interface screen for customizing a religious work in accordance with the disclosure.

For example, the systems and methods are offered to users through a website on the Internet. FIG. 2 shows an example user interface screen of the system 200 in which the user is able to customize multiple options for the religious work. The user interface screen 200 presents to the user the option to choose which religious work to customize 202, such as the Bible, for example, or any other religious text. The system 200 also presents to the user the option to choose the desired format the user wishes to publish the customized religious work 204. For example, the selected format in FIG. 2 is a hard copy format of the customized religious work.

The system shown in FIG. 2 also offers to the user the option to choose to customize multiple exterior customization options 206 and also offers to the user the option to choose to customize multiple interior customization options 208. The user can choose any desired number of exterior customization options 206 and/or interior customization options 208. Any desired number of exterior customization options 206 and interior customization options 208 can be offered to the user from a database stored in the system, such as on the remote server 112 shown in FIG. 1 and discussed above. The databases of exterior customization options and interior customization options can be a library of customization options provided by the system and can also include customization options or combinations of options chosen by other previous users of the system.

In some example systems, one or more of the exterior customization options and the interior customizations options can be rated or otherwise reviewed by one or more users. A user who has previously chosen a particular exterior or interior customization option can be permitted to rate and/or review the chosen option and the ratings and/or reviews can be made available for other users to view. The descriptions of both the exterior and interior customization options can also include a reference to the relative cost that is added to the publication of the customized religious work if the user were to select the particular customization option. The system may charge users for some portion of or all of the customization options. In an example, users are not charged for selecting a font or translation for the customized religious work, but the users are charged for other custom options like embossing or imprinting a design on the cover of the customized religious work or selecting premium materials for the cover.

The system shown in FIG. 2 also offers to the user the option to choose to select user-added content 210 to add to the customized religious work. The user-added content 210 is content that the user is adding to the system by the user from any source remote from the system 212, such as the user's computing device. The user-added content can also be content that is stored in a library of content added by other users and authorized for use by other users 214. For example, the user creates a custom image for the cover of the customized religious work on his or her own computer and uploads the custom image into the system to apply as an exterior customization option for the user's custom religious work. The user can designate whether the custom image is either restricted from access by other users or can be used by all other users or a select group of other users, such as a group of users from the same church, religious study group, or religion.

The system 200 also gives the user the option to create custom, user-created content within the system 216. The system 200 can have content creation tools like software that can create and/or edit or otherwise customize images. The user could begin an image on his or her own computing device and add/upload the unfinished image into the system 218. The unfinished image can be completed by the user within the system by using the system's user-created content tools. In another example, the user can request to access the user-created content tools in the system 200 to begin creating a customized option for the religious work, such as a customized image or a customized color for the cover or the text or other features of the religious work.

The system 200 shown in FIG. 2 also gives the users printing options 222 so the user can select one or both of a hard copy and an electronic copy format. In the example system shown in FIG. 2, the system 200 offers to the user the ability to request a hard copy printing and allows the user to select the paper type 224 to be used for the hard copy printing and also the quantity of hard copies 226 that are to be printed. The user can select a paper type 224 that a thin paper, such as paper having a weight of between 28-50 grams per square meter. The user can also select a single copy or a small quantity of copies of the customized religious work. In some examples in which the user selects a thin paper having a weight of 40-50 grams per square meter and a single or small quantity of hard copies, the customized religious work is printed using a light-fusion printing process that avoids using heat to adhere or fuse the ink to the paper.

The system 200 offers the user the ability to store or save 228 projects in progress, such as in memory on the remote server 112 shown in FIG. 1. The user can return to any unfinished or finished project and continue to add, delete, or edit any aspect of the customized religious work. The user can choose to cancel 230 various customization options that were added to the customized religious work, as desired. The user can order printed copies, in hard copy and/or electronic copy format, of any project at any time.

Figure 3:
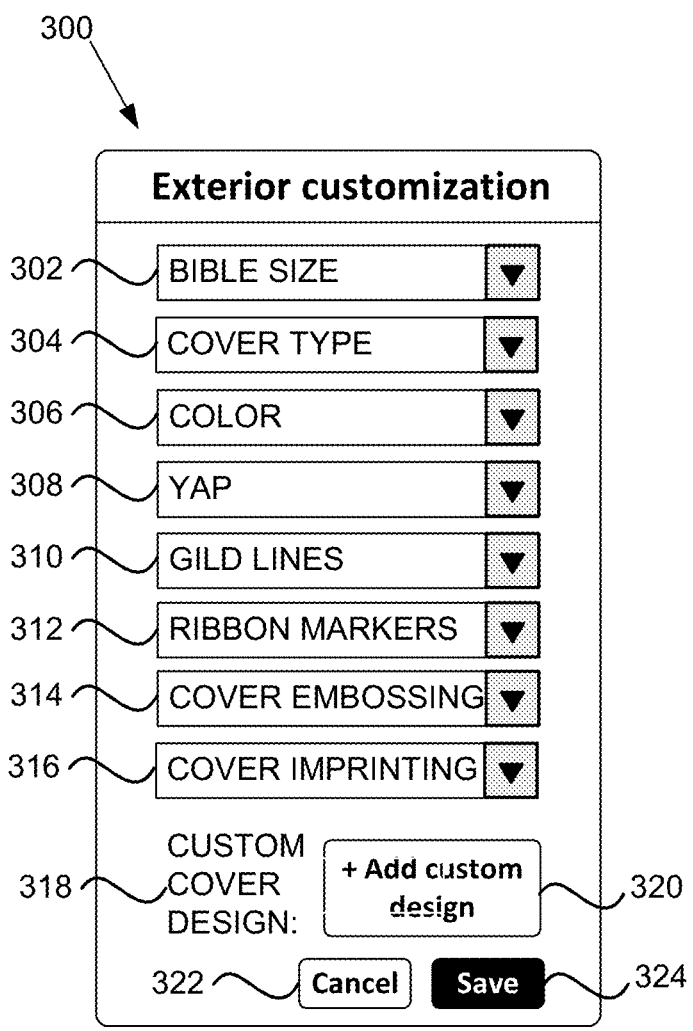
FIG. 3 is an example user interface screen for selecting exterior customization options for the religious work.

FIG. 3 shows multiple options for exterior customization options 300 for a Bible. For example, a student of Christianity, such as a devout member of a Christian church or a person studying to become a Christian clergy member, wants a custom Bible. An example of the disclosed systems and methods provides a website or application in which the student selects various exterior customization options for the Bible, such as the Bible's size 302, cover type 304, cover color 306, yap 308, gild lines 310, and the like. The student can also choose to add or customize other Bible features like adding ribbon markers 312, cover embossing 314, and cover imprinting 316.

The exterior features are stored in one or more existing databases of exterior customization options, in this example, from which the user can select the desired exterior customization options for the customized religious work. The offered Bible sizes can include a pocket-size, a mid-size, and a full-size option, in some examples. The Bible cover options can include selections of various leather types, such as Highland Goatskin, Calfskin, or French Moroccan leather. The Bible cover color options can include black, brown, red, blue, or green or any other suitable color in alternative examples. The yap options can include a full yap, semi yap, or no yap. The gild lines may include options for the user to select from double, single, or no gild lines. The ribbon markers are offered in options of various colors and fabrics and in any desired quantity of ribbon markers.

The user can also add custom cover design 318 for the example system for customizing a Bible shown in FIG. 3. For example, the covers of the Bible can be embossed or imprinted with options from an existing database offered to the user or can be embossed or imprinted with user-added or user-created content. The user can select to add a custom design to the Bible cover 320 in which case the user would be able to upload a stored image or design from a remote computer to the system, such as the user's own computing device. As discussed above, the user is able to either cancel 322 or store or save 324 the project at any time and can return to the project at a later time.

FIG. 4 shows multiple options for interior customization options 400 for a Bible. The user is able to customize the interior of the Bible by selecting one or more Biblical translations 402, text layouts 404, font style and size 406, margin size 408, text color(s) 410, headings 412, introductions 414, and the like. The users can also choose to add text or other features to the Biblical text, like cross-references 416, footnotes 418, note layout 420, note options 422, concordance 424, maps of various pertinent religious events or scriptures 426, historical confessions 428 or creeds 430, commentary 432, critiques 434, interpretations 436, indices 438, appendices 440, dictionaries 442, articles 444, and other supplemental material 446. The system 400 can also offer to the user the options to add extra blank pages for notes and other written words 448. The user can also choose to add custom text and/or images to the interior of the customized religious works 450 and can select to upload such a custom text and/or image 452 from the user's own computing device or another remote computing device. As discussed above, the user is able to cancel 454 or store or save 456 the project at any time.

Similar to the exterior customization options, the interior customization options are included in an existing database, in this example, from which the user can select the desired interior customization options of the customized religious work. The database can be stored in memory on the remote server 112 discussed above in reference to FIG. 1. In the example in which a user is customizing a Bible, the system can offer translations that include King James Version (KJV), English Standard Version (ESV), New King James Version (NKJV), Holman Christian Standard Bible (HCSB), New International Version (NIV), New American Standard Bible (NASB), New Living Translation (NLT), New Revised Standard Version (NRSV), Geneva, Tyndale, and international translations, among other translations in alternative examples. The text layout options may include paragraph, verse by verse, double column, or single column layouts. The font style and size can be selectable by the user, as well, along with wide or standard margin options and text color.

For the examples in which the user selects to customize a Bible, the interior customization options further include optional and the choice of selected introductions, headings, cross-references, footnotes, and notes. Note options may include study notes, study Bible, Geneva Bible, KJV original translator notes, custom notes and the like, in some examples. Concordance, whether extensive or condensed, is also an interior customization option along with maps and charts of various Biblical topics like Jesus' life, geographically significant Biblical and/or historical events, and the like.

Historical confessions and creeds may also be offered as interior customization options in the examples in which a user is customizing a Bible. The historical confessions and creeds can include Westminster standards, Apostles/Nicene/Chalcedonies/Athanasian Creeds, the Augsburg Confessions, Articles of Religion, London Baptist Confessions, and the like. Evangelistic content can also be offered as an interior customization option and includes Romans Road and Share Jesus without Fear, in this example. Still other interior customization options include dictionaries of proper names and events, indices, Epistle Dictionary, charts, articles, and extra blank pages. Any other exterior customization and interior customization options are offered in alternative examples.

Users can choose to customize any religious work, including the Bible and other works, whether based in Christianity or any other religion. The exterior customization options and the interior customization options are generally customized to the particular religious work that the user wishes to customize although some options may transcend more than one religious work, such as customizing color, font, and blank pages for notes, for example. A user can customize a selected religious work, such as the Bible, with options that are typically related to a different religious work, if desired. Any desired combination of customization options can be offered to the users.

The users that customize the religious works may do so at any desired location within the religious work. For example, a user might want to add an interior customization option as inserts within existing text, such as by inserting blank pages for notes between the Old and New Testaments of the Bible or between books within one or both Testaments, for example. Further, notes, articles, commentary, critiques, interpretations, etc. can be added anywhere within the Bible or other religious works, as desired. For example, users can choose to add their favorite commentary, interpretations, and blank pages after each Bible Testament. In another example, users can choose to add historical maps, critiques, and educational study guides after each Testament or after one Testament.

The translations, introductions, cross-references, notes, concordance, maps, historical confessions and creeds, charts, dictionaries, and the like can be included in an existing database provided by the disclosed methods and systems from which the users are able to select content for their custom religious works. Users can also choose to customize their religious works by adding their own content or "user-added" content, such as their favorite poems, pictures, or lyrics of their favorite religious songs. Further, users are also able to add their self-created or "user-created" works like artwork, personal notes, local church customs, and the like. The disclosed systems and methods for on-demand publication of religious works has the ability to compile content from provided content, user-added, and user-created content to create the users' desired, customized religious work.

Figure 5:
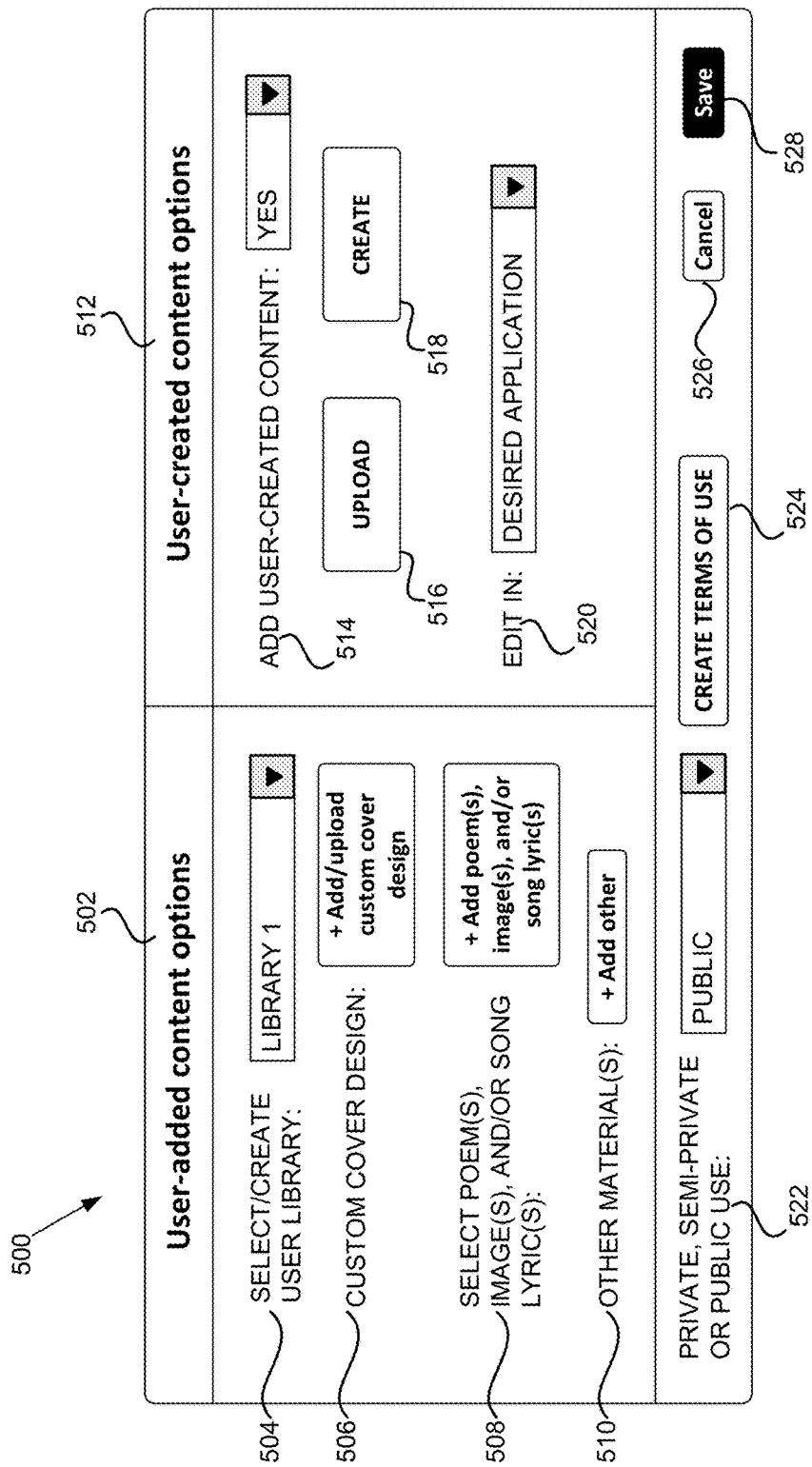
FIG. 5 is an example user interface screen for selecting user-added and user-created customization options for the religious work.

FIG. 5 shows multiple options for user-added and user-created content customization options 500 for a Bible. As discussed above, the users are able to add content and create content to the system to customize their religious works, such as their Bibles. The user-added content options 502 and the user-created content options 504 are content that does not already exist within the system, such as content that is stored in one or more of the available library databases. When adding user-added content options 502, the user is able to select a desired library 504 into which the user-added content is to be added and stored, at least for the purposes of creating the customized religious work. The user can also create a library into which the user-added content is added and stored. In the example system shown in FIG. 5, the user is able to select a particular custom cover design 506, for example, to store in the selected or created user library. The user is also able to select poem(s), image(s), and/or song lyric(s) 508 that are then stored in the selected or created user library. The user can also add other material(s) 510 that do not fall into an existing category and can also store such material in the selected or created user library. The user can then access the selected or created user library to use the user-added content to customize the user's religious work.

As mentioned above, the user can also add user-created content options 512 to the customized religious work. The user selects "yes" to add user-created content 514 and has the option to either upload user-created content 516 to or to begin creating a user-created content 518 in the system. With either option, the user has the choice to edit the user-created content in a desired application 520 either stored in or accessible by the system. The user can create the user-created content from a desired application either stored in or accessible by the system as well. Any user-created content is available for editing from the system, in the examples shown in FIG. 5 although in alternative examples, such editing is not available.

The user also has the choice to designate the user-added and user-created content as private, semi-private, or public 522. A private designation means that the user who added and/or created the user-added and/or user-created content is the only user that is able to access, view, and otherwise use the user-added and/or user-created content. A semi-private designation means that the user who added and/or created the user-added and/or user-created content can choose at least one other and sometimes a group of other users who are permitted to access the user-added and/or user-created content. A public designation means that the user who added and/or created the user-added and/or user-created content chooses to allow any other user to freely access and/or use the user-added and/or user-created content.

The user is also able to choose particular terms of use of any content the user adds or creates as user-added and/or user-create content 524. The terms of use can relate to who retains ownership of any rights to the content, who can view the content, who can use the content to customize a religious work, whether the user-added or user-created content can be further edited or changed by other users for their own use or otherwise, and the like. Any terms of use for the user-added or user-created content can be included. As discussed above, the project can be either canceled 526 or stored or saved 528 at any time.

As discussed above, the resulting customized religious works can be one or more hard copy formats and/or one or more electronic copy formats. Any desired combination of publication formats can be selected by the users. For example, some users choose to have a hard copy along with an identical or modified electronic copy of their customized religious work for their tablets or smart devices. Some users may wish to have multiple electronic copies that include an editable version and a non-editable version, for example. In this example, the editable version may be accessible only to the user(s) that created the customized religious work and the non-editable versions can be distributed to members of a religious study group.

Throughout any part of the process of creating the customized religious work, users can store the customized religious work and return to the stored project to later change, revise, add, delete or alter the stored information. The creative process for customizing the religious work includes any number of revisions, additions, deletions, etc. and can include group-editing type operations, if desirable.

Figure 6:
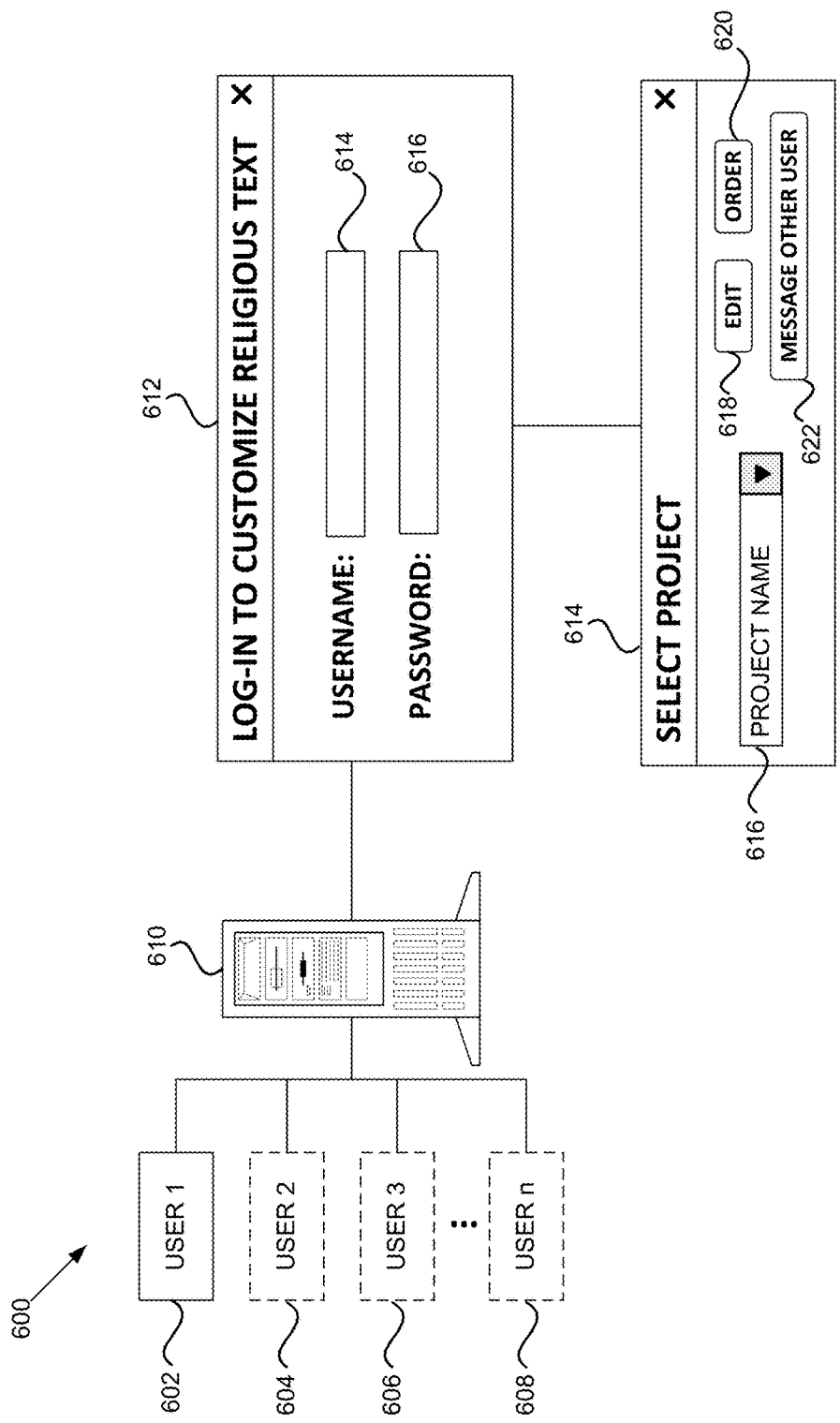
FIG. 6 is an example system for customizing religious works in which multiple users collaborate.

In some examples, multiple users collaborate to create a customized religious work as shown in FIG. 6. The example system shows a first user 602, a second user 604, a third user 606 and up to any desired number of users 608. Each of the users can access, view, edit, etc. any project on which the users agree to collaborate. The multiple users 602, 604, 606, 608 each connect to a server 610 that hosts the methods and systems disclosed here, likely over a network (not shown), although one or more users could directly connect to the server 610. The collaborative projects have restricted access, in some examples, to permit only authorized users to access and edit the projects. For example, only authorized users 602, 604, 606, 608 can access the collaborative project shown in FIG. 6 by entering a username 614 and password 616 on a log-in screen 612.

The authorized users 602, 604, 606, 608 shown in FIG. 6 are presented the option to select the project that they wish to view and/or edit 614. In some examples, there is only a single collaborative project while in other examples, there are multiple collaborative projects for the group or that are related to an individual user collaborating with multiple groups. After the desired project is selected, the users can choose to edit 616 the collaborative project in any combination of ways described above. The users can also order 618 various publications of the projects in any of the suitable ways discussed above. The users on a collaborative project may optionally be able to message each other 622 through the disclosed systems and methods and in some examples, the users can collaborate on edits and work on the project at the same time.

For example, a Bible study group wishes to create a custom Bible for their small-group use. One or more members selects the basic content for the exterior customization options, another one or more members selects the basic content for the interior customization options, and still another one or more members select user-added and/or user-created content. All or a portion of the study group's members have the ability to access, edit, change, approve, or otherwise view the customized Bible during the creative process.

In both the individual user projects and the multiple users, collaborative projects, the users can be presented with an option for a recommendation for one or more of the exterior customization options and the interior customization options. A recommendation can be one or more of the most popular customization options or can be a computerized or human consultant that helps users select various exterior customization and/or interior customization options for their customized religious work. Recommendations can also be one or more questions to another user or the author of another customized religious work. In this example, the user seeking a recommendation may be allowed to contact the author of the customized religious work from whom the recommendation is sought. Any suitable advice, recommendations, or input can be offered in any suitable manner to the users.

In some example methods and systems, hard copies of the customized religious works are printed without melting the ink in a heating process. For example, the customized religious works are published in hard copy format by using a light-fusion or flash fusion printing technique that relies on light to fuse the toner to the paper or other substrate. The toner or other ink substance absorbs energy from the applied light to adhere the toner or ink to the paper or other substrate without the use of heat or other potentially paper-damaging fusion methods. Further, the light-fusion printing methods create a smoother, thinner printed text and thus a less-bulky and overall thinner resulting finished publication than printing processes that rely on heating the ink.

Still further, conventional heat-fusion printing processes dehydrate the paper when the heat is applied and oftentimes require re-hydration of the paper after the printing is completed to avoid static build-up in the paper and for easy additional processing of the paper, such as stacking, cutting, folding, saddlestitching, etc. Rather, the light-fusion printing process altogether avoids the dehydration-rehydration process required by heat-application type printing processes, which results in a higher quality print and a more efficient and reliable printing process.

Even further, because the light-fusion technology avoids many printing challenges of traditional heat-fusion printing, like paper damage, reliability, static build-up, etc., low volume printing and even single publication printing is possible. The light-fusion processes do not require expensive printing presses to be created, like heated-fusion printing requires, which reduces the overall manufacturing and printing costs for low and single volume printing. Therefore, on-demand printing of customized religious works using light-fusion printing processes can be offered at a lower price than the more traditional heat-fusion printing processes.

Any suitable printing process can be used and the disclosed on-demand printing processes are not limited to the above-described light-fusion processes. Further, printing can be done on any desired substrate, including but not limited to, paper, such as Bible paper, plastic, and any other hard copy format. Identical, substantially similar, and/or modified versions of the same customized publication can be created in the hard copy format(s) and electronic copy format(s), as discussed above.

It will be appreciated that variations of the above-disclosed systems and methods for on-demand publishing of customized religious works, or alternatives thereof, may be desirably combined into many other different systems, methods, or applications. Also various presently unforeseen or unanticipated alternatives, modifications, variations, or improvements therein may be subsequently made by those skilled in the art.

The invention claimed is:

1. A method of on-demand printing of a customized religious work, comprising:
   receiving, at a user computing device, religious work user data that includes at least a selected version of a religious work, the selected version having one or more religious characteristics;
   presenting, via a user computing device, multiple exterior customization options based at least in part on the one or more religious characteristics;
   presenting, via the user computing device, multiple interior customization options based at least in part on the one or more religious characteristics, at least one of the interior customization options being one or more pieces of preset supplementary religious material, the one or more pieces of preset supplementary religious material presented based on a predetermined association of the presented supplementary religious material and at least a specific portion of the religious work being customized;
   at the user computing device, for at least one exterior customization options, receiving exterior customization data that includes exterior customization user selections selected from the multiple exterior customization options;
   at the user computing device, for at least one interior customization options, receiving interior customization data that includes interior customization user selections selected from multiple interior customization options;
   in response to receiving the exterior customization data and the interior customization data, automatically presenting a user content prompt on the user computing device that includes offering to accept at least one of user-added and user-created content to the customized religious work;
   receiving third data, at the user computing device, the third data including a third user selection that includes a response to the user content prompt;
   in response to receiving the response to the user content prompt, automatically compiling the religious work user data, the exterior customization data, the interior customization data, and any user content received in response to the user content prompt into the customized religious work;
   automatically generating a printing instruction that includes the religious work user data, the exterior customization data, the interior customization data, and the any user content received in response to the user content prompt; and
   printing the customized religious work via a light-fusion printer according to the printing instruction, at least a portion of the religious work being printed on paper having a weight of 28-50 grams per square meter.

2. The method of claim 1, further comprising automatically generating an electronic copy format of the customized religious work.

3. The method of claim 1, wherein the response to the user content prompt includes a request to include at least one of user-added and the user-created content to the customized religious work.

4. The method of claim 1, wherein the response to the user content prompt includes a request to include both of user-added and the user-created content to the customized religious work.

5. The method of claim 1, wherein the multiple exterior customization options are stored in a database having a plurality of exterior customization options.

6. The method of claim 1, wherein the multiple interior customization options are stored in a database having a plurality of interior customization options.

7. The method of claim 1, wherein the exterior customization data includes at least one of a size of the customized religious work, a cover type for the customized religious work, a cover color for the customized religious work, a yap, embossing for the cover of the customized religious work, imprinting for the customized religious work, gild lines, and ribbon markers for the customized religious work.

8. The method of claim 1, wherein the interior customization data includes at least one of a translation, a text layout, text font, margins, text color, introductions, headings, cross-references, footnotes, note layout, note options, concordance, maps, articles, critiques, historical confessions, historical creeds, blank pages, charts, and a dictionary.

9. The method of claim 1, wherein the response to the user content prompt includes choosing not to add user content to the customized religious work.

10. The method of claim 1, further comprising printing a single copy of the customized religious work via the light-fusion printing process in accordance with the printing instructions.

11. The method of claim 1, further comprising storing one or both of the customized religious work and the printing instruction on a server remote from the user computing device.

12. The method of claim 11, further comprising editing, at the user computing device, the stored customized religious work.

13. A method of on-demand printing of a customized religious work, including:
at a central server, receiving a request for printing of the customized religious work that includes at least a selection of a particular version of a religious work, exterior customization data, interior customization data, and user-added or user-created content customization data, wherein the exterior customization data includes exterior customization user selections selected from multiple exterior customization options and interior customization data includes interior customization user selections selected from multiple interior customization options, the multiple exterior customization options and the multiple interior customization options based on a religious characteristic associated with the particular version of the religious work, at least one of the interior customization options being one or more pieces of preset supplementary religious material applicable to a specific portion of the religious work based on a predetermined association of the one or more pieces of preset supplementary religious material with the specific portion of the religious work;
upon receipt of the user-added or user-created content customization data, automatically generating a user content prompt to upload a user content data file to the central server or to begin creating the user content data file in a user content creation module of the central server;
upon receipt of the upload of the user content data file or after the user content data file is created in the user content creation module of the central server, continuously presenting a user content complete option that, when selected, generates a user content complete message at the central server;
upon generation of the user content complete message, automatically generating, at the central server, a printing instruction for the customized religious work that includes the exterior customization data, the interior customization data, and the user-added or user-created content customization data;
receiving a request to print the customized religious work in a hard copy format and an electronic copy format;
upon receiving the request to print the customized religious work in the electronic copy format, automatically creating an electronic copy format of the customized religious work with an electronic copy portion of the exterior customization data, the interior customization data, and the user-added or user-created customization data; and
upon receiving the request to print the customized religious work in the hard copy format, automatically sending an instruction to a light-fusion printer to print a hard copy format of the customized religious work with a hard copy portion of the exterior customization data, the interior customization data, and the user-added or user-created content customization data.

14. The method of claim 13, wherein the hard copy format includes printing at least a portion of the customized religious work on paper having a weight that is 50 grams per square meter or less.

15. The method of claim 13, wherein the multiple exterior customization options include at least one of a size of the customized religious work, a cover type for the customized religious work, a cover color for the customized religious work, a yap, embossing for the cover of the customized religious work, imprinting for the customized religious work, gild lines, and ribbon markers for the customized religious work.

16. The method of claim 13, wherein the multiple interior customization options include at least one of a translation, a text layout, text font, margins, text font, margins, text color, introductions, headings, cross-references, footnotes, note layout, note options, concordance, maps, articles, critiques, historical confessions, historical creeds, blank pages, charts, and a dictionary.

17. The method of claim 13, further comprising storing one or both of the customized religious work and the printing instruction on the central server.

18. The method of claim 17, further comprising editing the stored customized religious work.

19. A method of on-demand printing of a customized religious work, comprising:
receiving a religious work user selection, the religious work user selection having a religious characteristic associated therewith;
receiving an exterior customization user selection selected from a plurality of exterior customization options that are based at least in part on the religious characteristic;
receiving an interior customization user selection selected from a plurality of interior customization options that are based at least in part on the religious characteristics, at least one of the interior customization options being one or more pieces of preset supplementary religious material, the one or more pieces of preset supplementary religious material presented based on a predetermined association of the presented supplementary religious material and at least a specific portion of the religious work being customized;
receiving user custom content data that includes at least one of no user custom content, a user-added content or a user-created content;
creating printing instructions for the customized religious work including the particular version of the religious work, the at least one exterior customization option, the at least one interior customization option, and the user custom content data, the printing instructions containing the customized religious work in at least one of an electronic format or a printed format.

20. The method of claim 19, wherein receiving a religious work user selection, includes:

receiving a selection of a religious work;
presenting one or more versions of the religious work; and
receiving a user selection of the religious work and a
    version of the religious work.

* * * * *